US009930120B2

(12) United States Patent
Gutierrez

(10) Patent No.: US 9,930,120 B2
(45) Date of Patent: Mar. 27, 2018

(54) INFRASTRUCTURE-TO-VEHICLE COMMUNICATION SYSTEM AND METHOD

(71) Applicant: Enrique Gutierrez, La Grange, IL (US)

(72) Inventor: Enrique Gutierrez, La Grange, IL (US)

(*) Notice: Subject to any disclaimer, the term of this patent is extended or adjusted under 35 U.S.C. 154(b) by 0 days.

(21) Appl. No.: 15/185,971

(22) Filed: Jun. 17, 2016

(65) Prior Publication Data

US 2017/0018179 A1    Jan. 19, 2017

Related U.S. Application Data

(60) Provisional application No. 62/193,937, filed on Jul. 17, 2015.

(51) Int. Cl.
| | |
|---|---|
| G08G 1/09 | (2006.01) |
| H04L 29/08 | (2006.01) |
| G08G 1/0967 | (2006.01) |
| H04W 92/10 | (2009.01) |

(52) U.S. Cl.
CPC ......... *H04L 67/12* (2013.01); *G08G 1/09675* (2013.01); *G08G 1/096716* (2013.01); *G08G 1/096725* (2013.01); *G08G 1/096783* (2013.01); *G08G 1/096791* (2013.01); *H04L 67/18* (2013.01); *H04W 92/10* (2013.01)

(58) Field of Classification Search
CPC ........ G08G 1/091; G08G 1/07; G08G 1/0104; G08G 1/0967; G08G 1/096741; G08G 1/096783; G08G 1/0129; G08G 1/0133; G08G 1/0137; G08G 1/096716; G08G 1/096725; G08G 1/09675; H04L 67/12

USPC ....................................................... 340/905
See application file for complete search history.

(56) References Cited

U.S. PATENT DOCUMENTS

| 7,133,767 B2 | 11/2006 | Ogino et al. .................. 701/200 |
| 7,295,925 B2 * | 11/2007 | Breed .............. G08G 1/096783 340/436 |
| 7,304,589 B2 | 12/2007 | Kagawa ................... 304/995.13 |
| 7,499,675 B2 | 3/2009 | Tsuzuki et al. ................. 455/73 |
| 7,561,846 B2 | 7/2009 | Kellum ........................ 455/41.2 |

(Continued)

*Primary Examiner* — John A Tweel, Jr.
(74) *Attorney, Agent, or Firm* — David G. Rosenbaum; J. Peter Paredes; Rosenbaum IP

(57) ABSTRACT

The system and methods according to the present invention advantageously provide redundant, confirmatory or control signals or information or data capture, for motorist and/or autonomous or driverless vehicles. These control, confirmatory or redundant signals or information may be used by driverless vehicles, trucks, motorist, pedestrians and cyclist to navigate roadways or receive or validate infrastructure information or make decisions based on conditions. The signals may also be used by motorists, pedestrians and electronic devices to gather data and make decisions. The redundant, confirmatory or control signals or information communication may be done via visible, non-visible or radio-frequency spectrum. The system may be implemented by embedding hardware or electronics or optics into or on luminous sign systems, traditional sign systems or mounted onto infrastructure such as guard rails, bridges or other fixed or temporary systems for the purpose of transmitting and/or receiving signals/messages or communication using visible and non-visible light spectrum.

14 Claims, 12 Drawing Sheets

(56) References Cited

U.S. PATENT DOCUMENTS

| | | | |
|---|---|---|---|
| 8,483,612 B2 | 7/2013 | Yamamoto | 455/41.2 |
| 8,995,662 B2 | 3/2015 | Rubin et al. | 380/255 |
| 8,996,287 B2 * | 3/2015 | Davidson | G08G 1/0129 |
| | | | 701/119 |
| 9,322,709 B2 | 4/2016 | Talyansky et al. | 250/459 |
| 9,323,710 B2 | 4/2016 | Metrani et al. | 398/106 |
| 9,342,475 B2 | 5/2016 | Metrani et al. | 398/106 |
| 9,344,503 B2 | 5/2016 | Stahlin et al. | 370/328 |
| 9,478,130 B2 * | 10/2016 | McDevitt-Pimbley | G08G 1/096783 |

* cited by examiner

Photovoltaic Power Source

404

MUTCD compliant front sign surface retro-reflective and translucent to IR and visible spectrum

406

Electronics, battery, controls, logic memory and other components in protective enclosure IR LED's are mounted alongside the visible spectrum LED's on the edge lit optic sections

INFRASTRUCTURE-TO-VEHICLE COMMUNICATION SYSTEM AND METHOD

CROSS-REFERENCE TO RELATED APPLICATIONS

This Application claims priority to U.S. Patent Provisional Application Ser. No. 62/193,937 filed Jul. 17, 2015, which is herein incorporated by reference in its entirety.

BACKGROUND OF THE INVENTION

The present invention relates to a method whereby fixed or temporary infrastructure and/or other roadway system, devices, installation and components are able to communicate with or respond to vehicles, pedestrians, handheld devices, electronics or traffic components, traffic control or other infrastructure and/or vehicles, pedestrians, handheld devices, electronics or traffic components, traffic control or other infrastructure may communicate or respond with the fixed or temporary infrastructure and/or other roadway system including for collection and processing of data or analytics. The present invention proposes a separate spectrum from the primary vehicle-to-vehicle communication band in order to provide safety and redundancy.

SUMMARY OF THE INVENTION

The system and methods according to the present invention advantageously provide redundant, confirmatory or control signals or information or data capture, for motorist and/or autonomous or driverless vehicles. These control, confirmatory or redundant signals or information may be used by driverless vehicles, trucks, motorist, pedestrians and cyclist to navigate roadways or receive or validate infrastructure information or make decisions based on conditions. The signals may also be used by motorists, pedestrians and electronic devices to gather data and make decisions. The redundant, confirmatory or control signals or information communication may be done via visible, non-visible or radio-frequency spectrum. The redundant signals may act as back up signals while working in conjunction with other installed communication systems. The system may be implemented by embedding hardware or electronics or optics into or on luminous sign systems, traditional sign systems or mounted onto infrastructure such as guard rails, bridges or other fixed or temporary systems for the purpose of transmitting and/or receiving signals/messages or communication using visible and non-visible light spectrum.

As will be described in greater detail below, the present invention advantageously provides various forms of communication, i.e., infrastructure to vehicle communication (I2V), infrastructure to pedestrian communication (I2P), infrastructure to anything communication (ITX) and roadside to vehicle communication (R2V).

One embodiment of the present invention is a roadway and transportation communication system comprising a plurality of communication devices coupled to vehicles, pedestrians, and infrastructure. The communication devices are configured to communicate to each other for the purpose of sharing infrastructure and roadway information as well as roadway conditions.

Another embodiment of the present invention is an individual piece of infrastructure such as but not limited to a road sign coupled with a communication device to transmit or broadcast data pertaining to its identifying information, GPS location, traffic direction, road hazard information, mile marker, curve ahead, bus stop, school zone, weather information, construction information, and exit information.

Yet another example embodiment of the present invention is a method of vehicle, pedestrian and roadway infrastructure roadway communication comprising the steps of transmitting data signals from infrastructure to vehicle, the vehicle receiving the transmitted data, and further notifying the driver via a notification system such as a mobile app or car console system regarding the data received, or taking a control action to redirect the car based on the data received.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

DETAILED DESCRIPTION OF THE PREFERRED EMBODIMENTS

Figure 1:
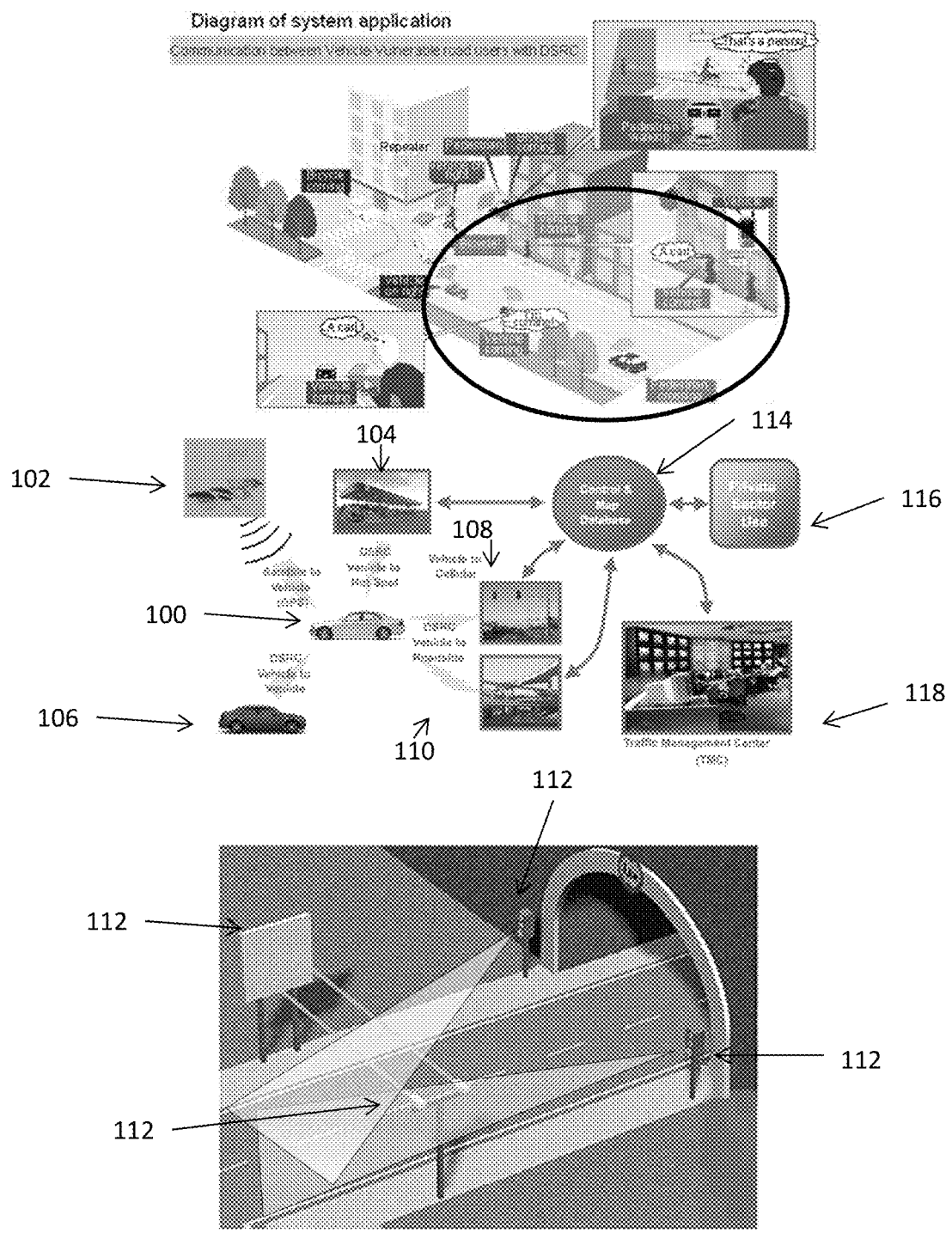
FIG. 1 is a diagram generally representing the roadway and transportation communication system.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The invention describes a roadway communication system that may include fixed or temporary infrastructure as well as fixed or portable devices for the purpose of communicating information, data, status, conditions or as a redundant or confirmatory system for control, navigation or decision making on roadways, trials or paths. These devices may be carried by individuals, or mounted to cars, trucks, snow plows, emergency vehicles or other infrastructure including but not limited to street signs, bridges, guard rails, traffic signals, and temporary infrastructure such as barrels or barricades or even on the road itself.

The systems and devices are designed to communicate or signal information or data which may benefit vehicles, driverless vehicles, pedestrians or motorists. The information or data communicated by the systems and devices include but is not limited to: identification information, relative distance or position, required actions, temporary changes or modifications, height width, distance or other mechanical information, speed, change in speed, stopping distance or other vehicle movement information, information for temporary changes or related to ongoing road work or construction, time, date, delay or other time related data, data or information related to vehicles status including position, movement, direction, velocity, identification or location or navigation related information such as the location of guardrails or lane closures or flooding or weather or timing related events or instructions, suggestions or requirements for the receiving entity, license plate numbers, VIN numbers, GPS location, traffic direction, road hazard information, mile marker, curve ahead, bus stop, school zone, weather information, construction information, exit information, timing, phase or basic safety messages, device operational instructions and operating parameters.

In one embodiment of the invention, the roadway and transportation system comprises of communication devices coupled to a system member such as a piece of infrastructure, a vehicle, or a pedestrian. In the case of the pedestrian the device may be a mobile phone configured to send and receive data signals within the system. In the case of the infrastructure, an example device may comprise electronics including but not limited to, a pcb with a microprocessor, memory, rf chipset such as Bluetooth, Wi-Fi, or cellular modem, an antenna, and a means for transmitting and receiving non-visual spectrum light such as an infrared receiver and non-visual spectrum LEDs, lasers, or microwaves, all housed within a package coupled to a power supply and mounted onto the piece of infrastructure. In the case of a vehicle the example device may comprise a similar device described above and mounted to the vehicle, or a modified version including a non-visible spectrum illumination source embedded into the headlight or tail lamp compartment, or modified version mounted to the front or rear license plates of the vehicle configured to communicate with the vehicle console and control system.

In one embodiment of the invention, the communication between the infrastructure and any other member of the system may be unidirectional. This unidirectional communication may be, for example, a one-way broadcast of information such as sending a signal concerning a closed road from the infrastructure to an oncoming car.

In another embodiment of the system, the communication between the infrastructure and any other member of the system may be bi-directional. In a bi-directional implementation, the infrastructure and additional device may both send and receive data to and from each other. This mode of communication allows members within the system to collect data or verify message receipt as examples.

In other embodiments of the system, further the communication between the infrastructure and any system member may be point to point, point to multipoint or multipoint to multipoint. The communication may be directional or omnidirectional.

In one embodiment, the communication between the infrastructure and any other system member may be used as a primary means of control or used for confirmatory, verification or redundant information or data exchange. For example, in the case of a driverless car, the guardrail may send a communication to the car regarding the cars relative position to the guardrail. If the car gets too close, the guardrail may issue a control signal that takes control and redirects the driverless car onto a safer obstruction free path. In another example, in the case of a conventionally driven car, the guardrail may simply send a signal to the car to communicate its relative location and in turn the car communicates that signal to the driver who may not have otherwise noticed.

The communication between the infrastructure and any other system member may be in a radio frequency spectrum, visible or non-visible light spectrum, and audible or via other means including or utilizing cables, antennas, transmitters, receivers, transceivers and reflectors, optics, lens and other means of directing or transmitting signals including optical signals.

The communication between the infrastructure and any other device may be by means of a system integrated into the component or infrastructure or by means of a system added to or overlaid over the component or infrastructure.

The communication between the infrastructure and any other device may operate over a very short range or a very long range based on the need and conditions.

In some embodiments of the invention, the communication device is configured to be connected to a back-end cloud server through the use connection means including but not limited to Ethernet, WI-Fi, Bluetooth, and cellular modem. The back-end server is configured to deliver real-time updates to device concerning matters including but not limited to road conditions, construction schedule, traffic patterns, weather, and school zone speed changes. The back-end cloud server is configured to transmit the above mentioned data to the device to be broadcast to oncoming vehicles and pedestrians as well as keep a status check on the device itself.

FIG. 1 is an illustrative diagram depicting multiple items of infrastructure, pedestrians, motorists and vehicle interacting within the system. For example, the vehicle 100, may be in communication with a satellite 102, a vehicle hotspot 104, another vehicle 106, a cellular hotspot 108, the roadside 110 or other infrastructure 112 to share data as described above. In some embodiments, all communications may be routed through a control database 114 and communicated to private databases 116 or for example traffic management centers 118 (also referred to as a control and map database or back-end cloud server). The I2V, I2P, I2X or other systems may serve as communication and signaling systems or serve multiple purposes including conveying visual, audible, illuminator or other purposes.

Figure 2A:
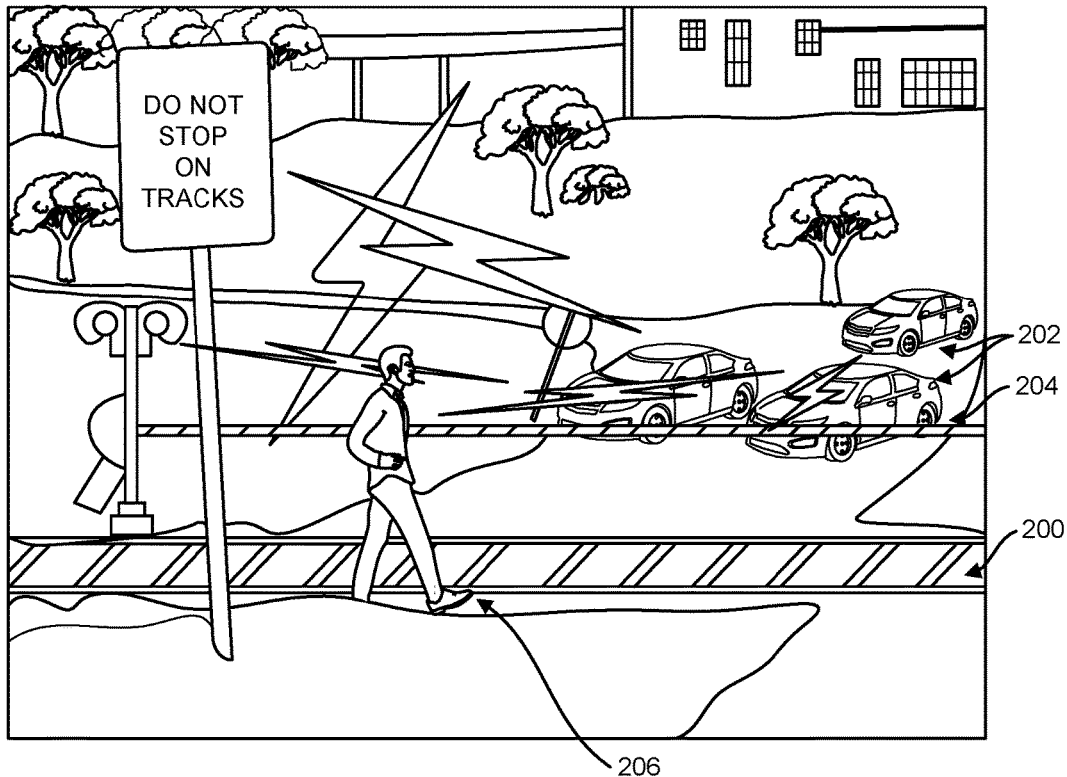
FIGS. 2A-D are diagrams representing infrastructure communicating with vehicles or vehicles communicating with infrastructure.

As further illustrated in an embodiment in FIG. 2A, the present invention contemplates that a signal or communication may be provided from, for example, railway infrastructure 200, to nearby vehicles 202. In this non-limiting example, a signal is sent from the railway infrastructure 200, train, or crossing gates 204 to nearby vehicles 202 and pedestrians 206 alerting them to the train crossing. In one embodiment the signal may act to control the vehicle 202 such that the vehicle 202 is forced to stop at certain proximity safely away from the train. Another example includes the pedestrian 206 signal being broadcast to the train infrastructure alerting the incoming train of a pedestrian 206 being in unsafe proximity of the tracks 200. This may allow the train to slow earlier or allow the infrastructure to alert the pedestrian 206 of his unsafe proximity. In another embodiment the vehicle may use the data to confirm information, data or commands received on a separate control communication system such as 5.9 GHz Vehicle-to-Vehicle or Infrastructure-to-Vehicle.

Figure 2B:
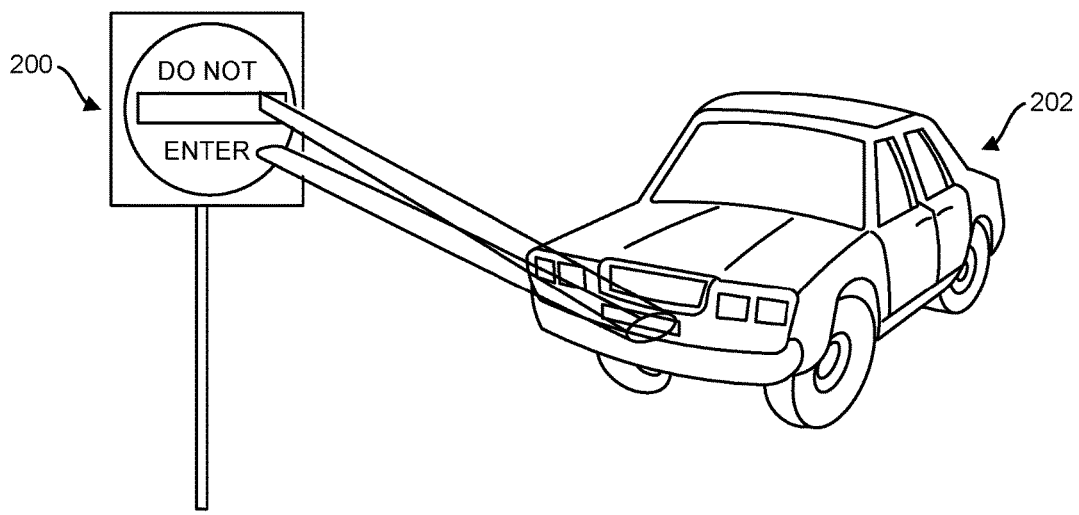
Figure 2C:
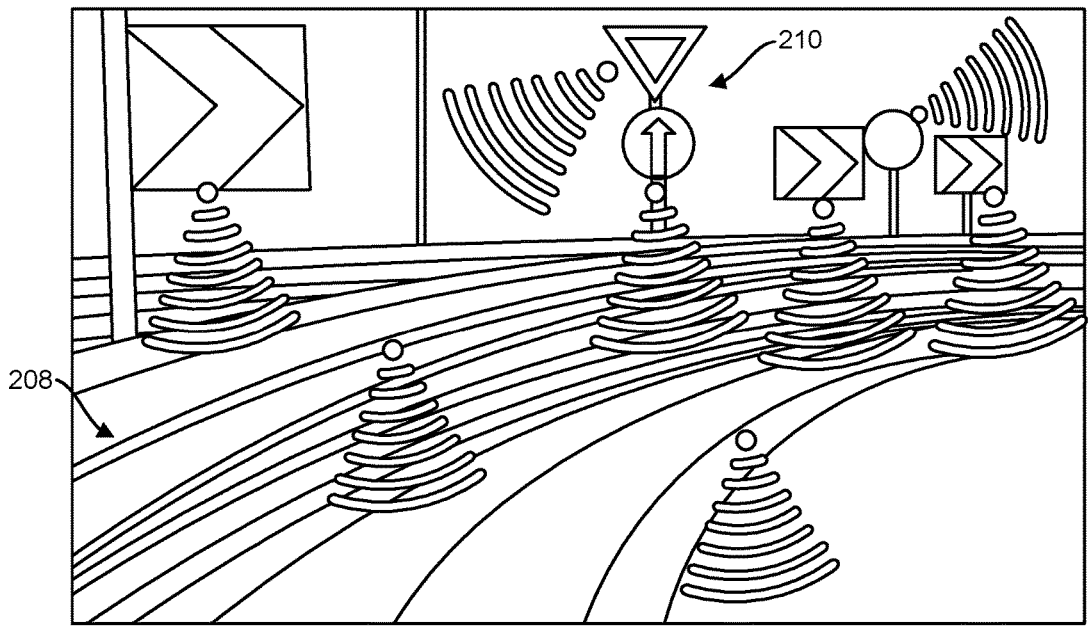
Figure 2D:

Further examples of infrastructure and vehicle communication are depicted in FIGS. 2B-2D. FIG. 2B depicts a vehicle communicating with a road sign. In this example the vehicle may be transmitting information to the sign pertaining to its speed, direction, license plate, or VIN. FIG. 2C depicts communication from guardrails 208 and traffic signs 210 warning of current road conditions and proximities while FIG. 2D communicates to the car that a stop sign 212 is ahead and that the road veers 214.

The information or signaling communicated may be fixed into the device or changeable via sensors or with Wi-Fi, grids, radio or other networks, sensors, radios, computer systems, electronic circuitry, electro-mechanical systems and or interactive components may be embedded in, part of or otherwise part of the I2X system.

Figure 3:
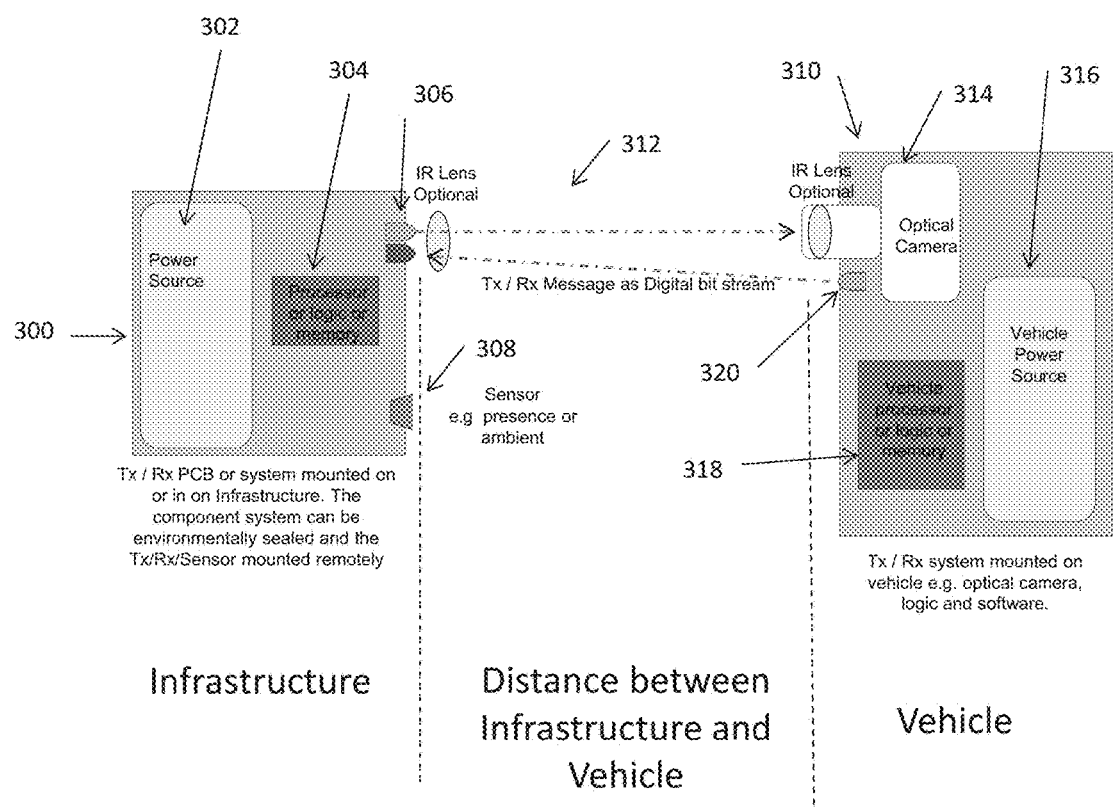
FIG. 3 is a diagram representing various configurations of communication devices and examples of communication between two devices.

FIG. 3 depicts an example embodiment of member devices of the system in communication. In this example embodiment, the infrastructure is coupled to a device 300 with a power source 302, processor and memory 304, as described above capable of transmitting, receiving, or both transmitting and receiving signals. The TX/RX may be in the form 306 of an antenna, IR lens, microphone and speaker combination or sound wave generating device, or even optical cameras. Some embodiments of the device 300 may have sensors 308 including ambient sensors or presence sensors. As described, I2V, I2X or R2V devices may be powered 302 by photovoltaics, battery, power supplies or other appropriate and available power source technologies.

The device 300 is in communication 312 with a second device 310 configured similarly to the device 300 coupled to by way of non-limiting example a vehicle. The vehicle itself may have components of the system pre-embedded in onboard vehicle systems. For example the onboard vehicle camera 314 may function as the signal receiver 306, the onboard electronics and logic 318 may function as the Processor 304 or the onboard power system 316 may function as the power source 302. In this embodiment, vehicles optical camera 314 may be further configured to receive the IR pulsed bit stream 312 and onboard systems such as logic 318, software and power 316 are used to enable the system.

Figure 4A:
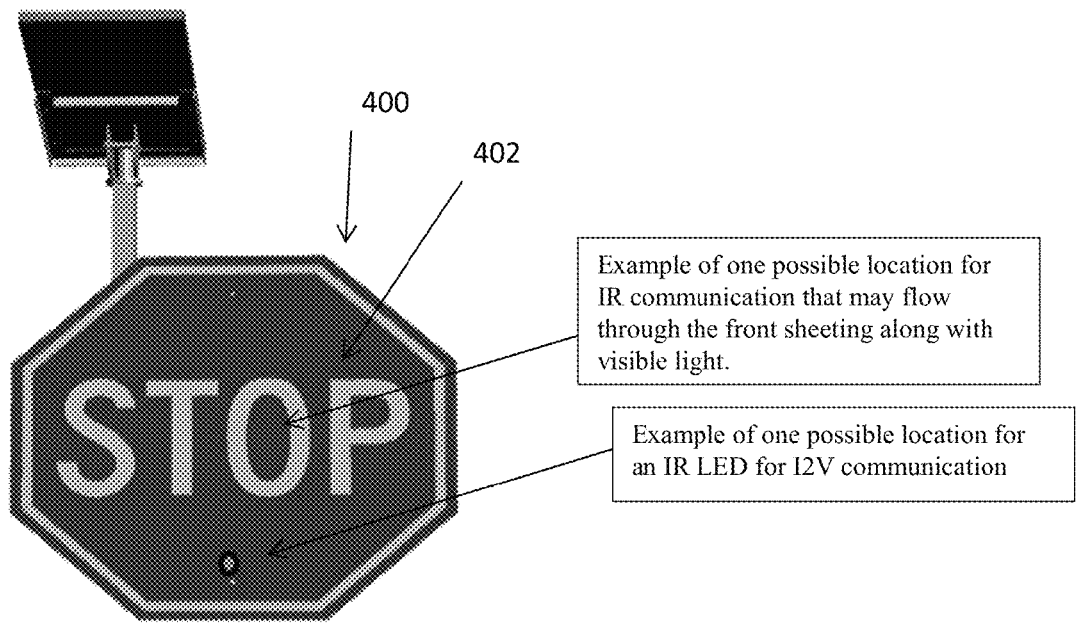
FIGS. 4A-E are diagrams representing a road sign coupled with a communication means.
Figure 4B:
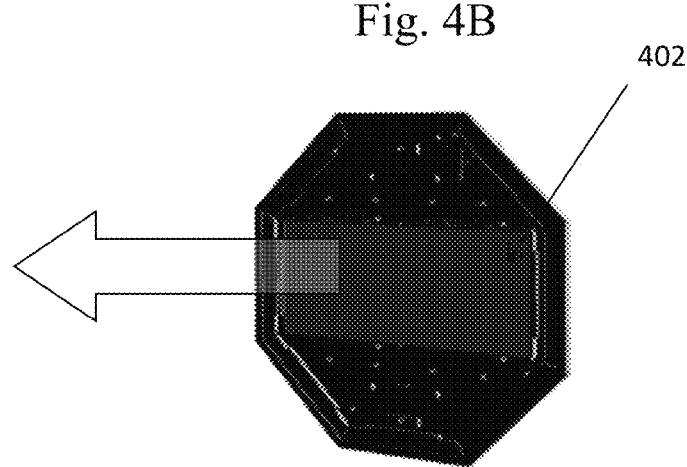
Figure 4C:
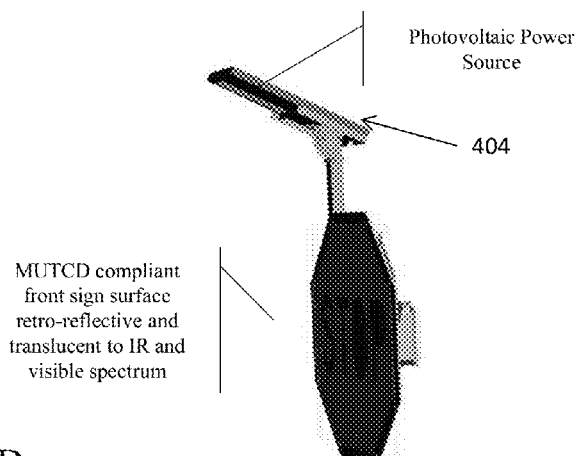
Figure 4D:
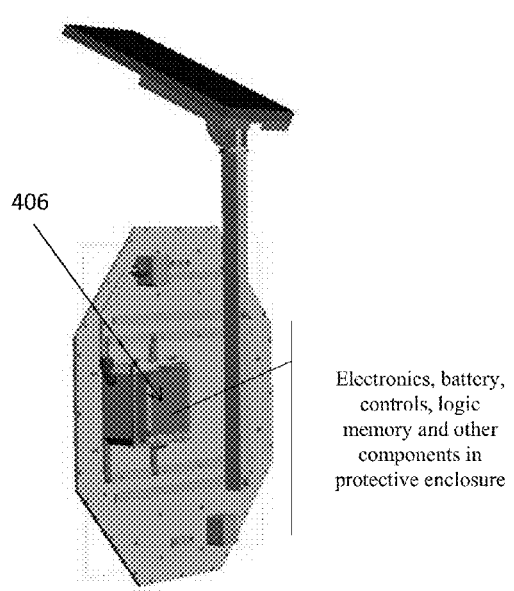
Figure 4E:
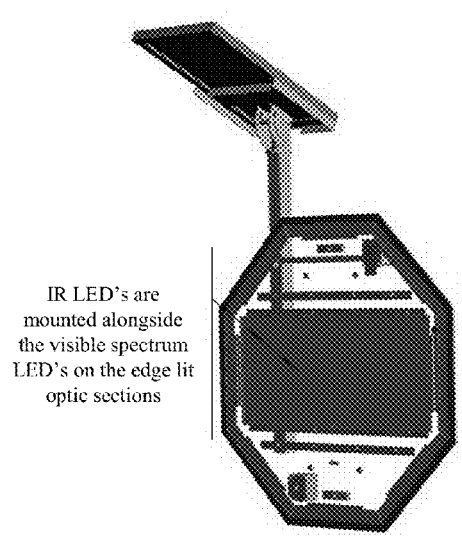

FIGS. 4A-D depict an example embodiment of an individual infrastructure member of the system. The traffic sign 400 depicted is embedded with a communication means. This example includes a front graphic system 402 on a front surface and rear surface of the sign that is retro reflective and transmissive to light in various spectrums. In this example as shown in FIG. 4B, the transmissive portion of the sign allows for IR light carrying data signals to pass through the sign to the appropriate IR receiver. In this embodiment as shown in FIG. 4C, the sign is equipped with a photovoltaic power source 404 allowing it to be powered in the middle of the road without need to run additional powerlines. FIG. 4D depicts the back of the sign equipped with a housing 406 containing additional control circuits, power supplies, and communication means described above. FIG. 4E depicts the inside of the example sign containing IR LED's mounted alongside visible spectrum LEDs on the edge lit optic sections of the sign. Simultaneously the non-visible spectrum LEDs may emit light which is coupled into the edge lit optic. The edge lit optic distributes the light uniformly along the entire optic and ultimately directs a good amount of that light out the front face of the optic and through the front sheeting surface which may be used for data communication with other devices such as driverless vehicles. In some embodiments, the device or road sign may be configured to include a filter system coupled to the device configured to reduce non-visual spectrum of light noise or interference or enable selectivity of the desired signal or band.

Figure 5A:
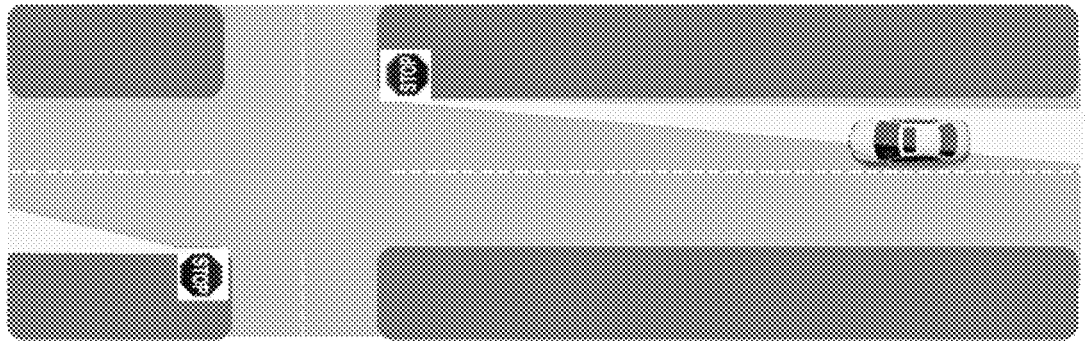
FIGS. 5A-5B are diagrams representing a road sign coupled with a communication means and a system to communicate with vehicles on the road.
Figure 5B:
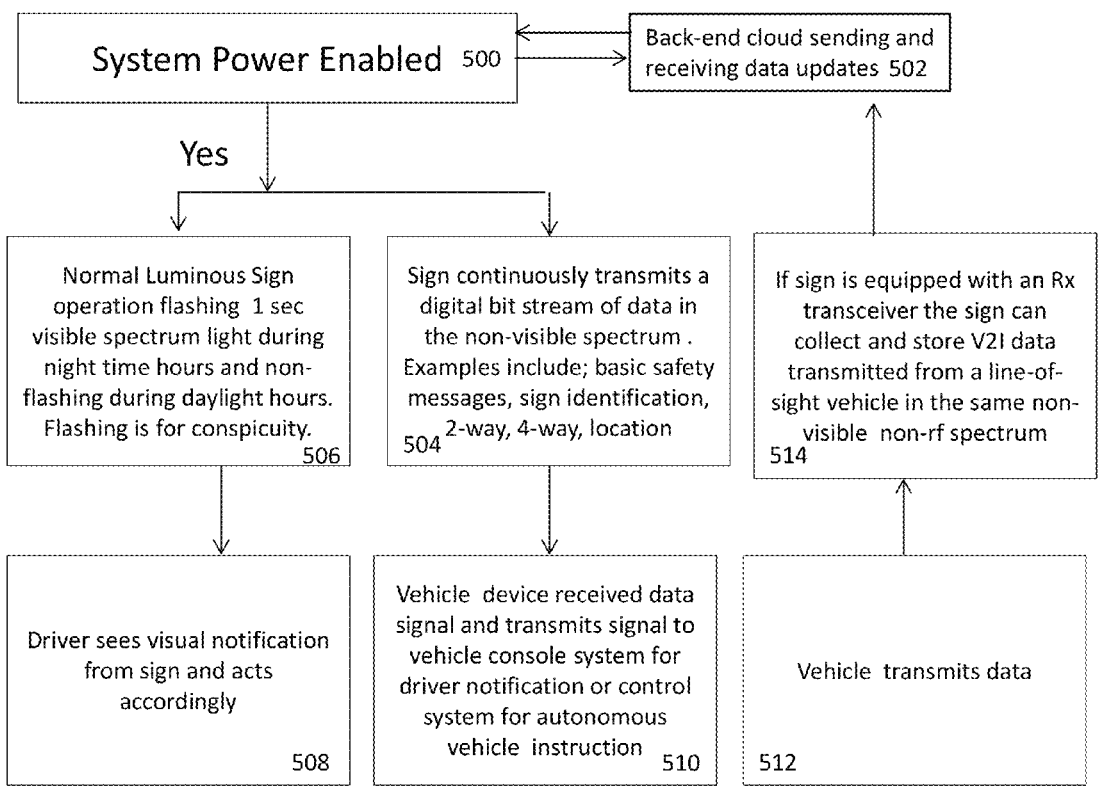

FIGS. 5A-B represent a process flow chart further describing the system and method used to communicate in the example of a vehicle approaching a stop sign that resides within the line of sight of a non-visual spectrum light transmitted from the stop sign. The flow chart in FIG. 5B describes the system as being coupled to a power source and the power enabled. Once the power is enabled 500, the next step 504 involves the sign continuously transmitting a digital bit stream of data in the non-visible spectrum. Examples of data include but are not limited to; basic safety messages, sign identification, 2-way, 4-way, location. The sign additionally take the step 506 of flashing 1 sec visible spectrum light during night time to providing additional visual alerts 508. As the vehicle approaches and is within the line of sight of the non-visual spectrum broadcast, the device coupled to the vehicle receives the data signal and communicates the signal to the driver through the console or audio system of the upcoming stop sign 510. In the case of a driverless vehicle, the signal for stop sign will notify the car of the location to stop. Also included in the process chart is the additional step of a back-end cloud server communicating with the device coupled to the sign 502. The back-end could server provides the additional step of updating the sign with pertinent traffic and infrastructure data as described above. In embodiments where the device has the ability to receive data signals, passing by vehicle may transmit pertinent traffic and infrastructure data to the device 512, and in turn the device may transmit the data 514 back to the back-end cloud server to communicate with other devices coupled to the system.

Figure 6:
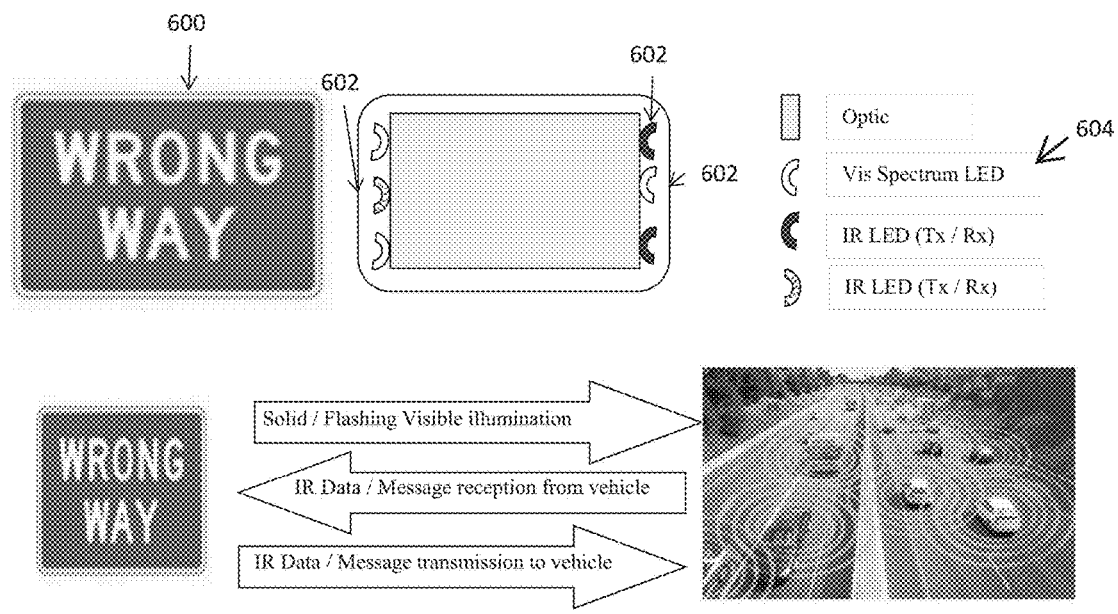
FIG. 6 represents a configuration of a traffic sign with a communications means.

Another example embodiment is described in FIG. 6. In this embodiment multiple non-visible spectrum LEDs 602 such as, but not limited to IR LEDs and visible spectrum LEDs 604 are mounted to the border of the optical area of the wrong way sign 600. In this embodiment, the IR data is sent back and forth between cars and the sign notifying them that they are heading in the wrong direction. The sign can emit a signal that controls the car and directs it to safety or just simply alert the driver that they are heading the wrong way. While the visual spectrum LEDs may alert a car that uses an optical capture system instead of IR or just alert a driver with the enhanced visual notice.

Figure 7A:
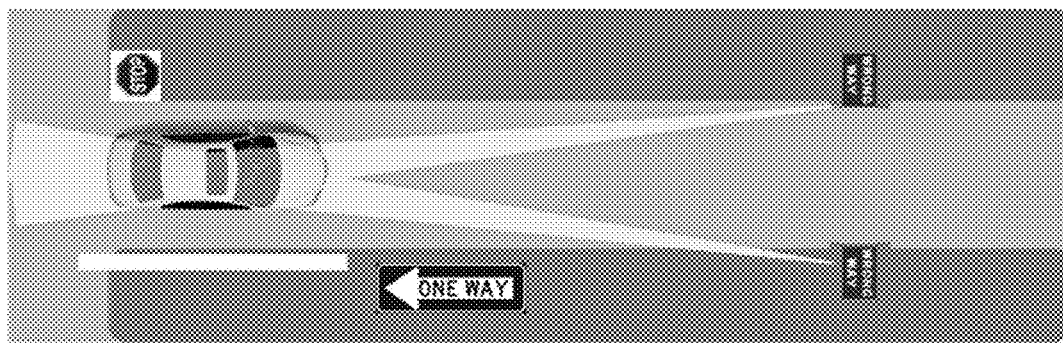
FIGS. 7A-7B are diagrams representing an I2V example between a wrong way sign and a vehicle.
Figure 7B:
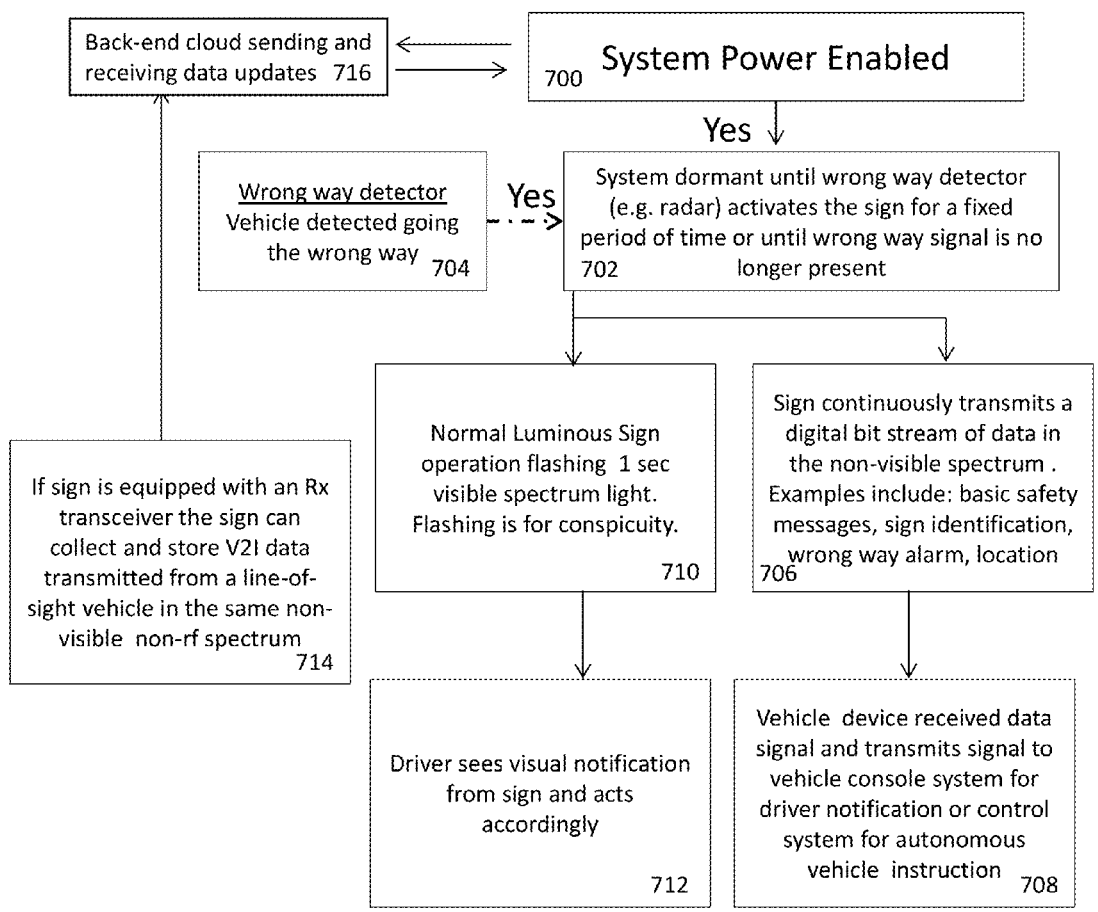

FIGS. 7A-B depict a process chart describing the system and steps taken in the example described above where the device is coupled to a wrong way sign and a second device is coupled to a vehicle. The flow chart in FIG. 7B describes the system as being coupled to a power source and the power enabled 700. In one embodiment the sign stays powered, in another embodiment the sign lays dormant 702 until a vehicle approaches and the steps of activating additional proximity sensors or line of sight sensors are activated 704. Once the power is enabled, the next step involves the sign continuously transmitting a digital bit stream of data in the non-visible spectrum 706. Examples of data include but are not limited to: basic safety messages, sign identification, wrong way alarm, and location. In some embodiments, the sign additionally takes the step of flashing 1 sec visible spectrum light during night time to providing additional visual alerts. As the vehicle approaches and is within the line of sight of the non-visual spectrum broadcast, the device coupled to the vehicle receives the data signal and communicates the signal to the driver through the console or audio system that vehicle is driving in the wrong direction. In the case of a driverless vehicle, the signal for wrong way sign will notify the car of the direction of traffic may instruct the vehicle to redirect into the proper direction 708. Also included in the process chart is the additional step of a back-end cloud server communicating with the device coupled to the sign 714. The back-end cloud server provides the additional step of updating the sign with pertinent traffic and infrastructure data as described above and may update other vehicles in the area of the presence of a wrong way vehicle by means of additional I2V devices in the roadway. In some embodiments, the sign additionally takes the step of flashing 1 sec visible spectrum light during night time 710 to providing additional visual alerts 712. As the vehicle approaches and is within the line of sight of the non-visual spectrum broadcast, the device coupled to the vehicle receives the data signal and communicates the signal to the driver through the console or audio system that vehicle is driving in the wrong direction 708. In the case of a driverless vehicle, the signal for the appropriate speed will notify the vehicle and may instruct the vehicle to reduce speed accordingly. In embodiments where the device has the ability to receive data signals, passing by vehicle may transmit pertinent traffic and infrastructure data to the device, and in turn the device may transmit the data back to the back-end cloud server to communicate with other devices coupled to the system 716.

Figure 8:
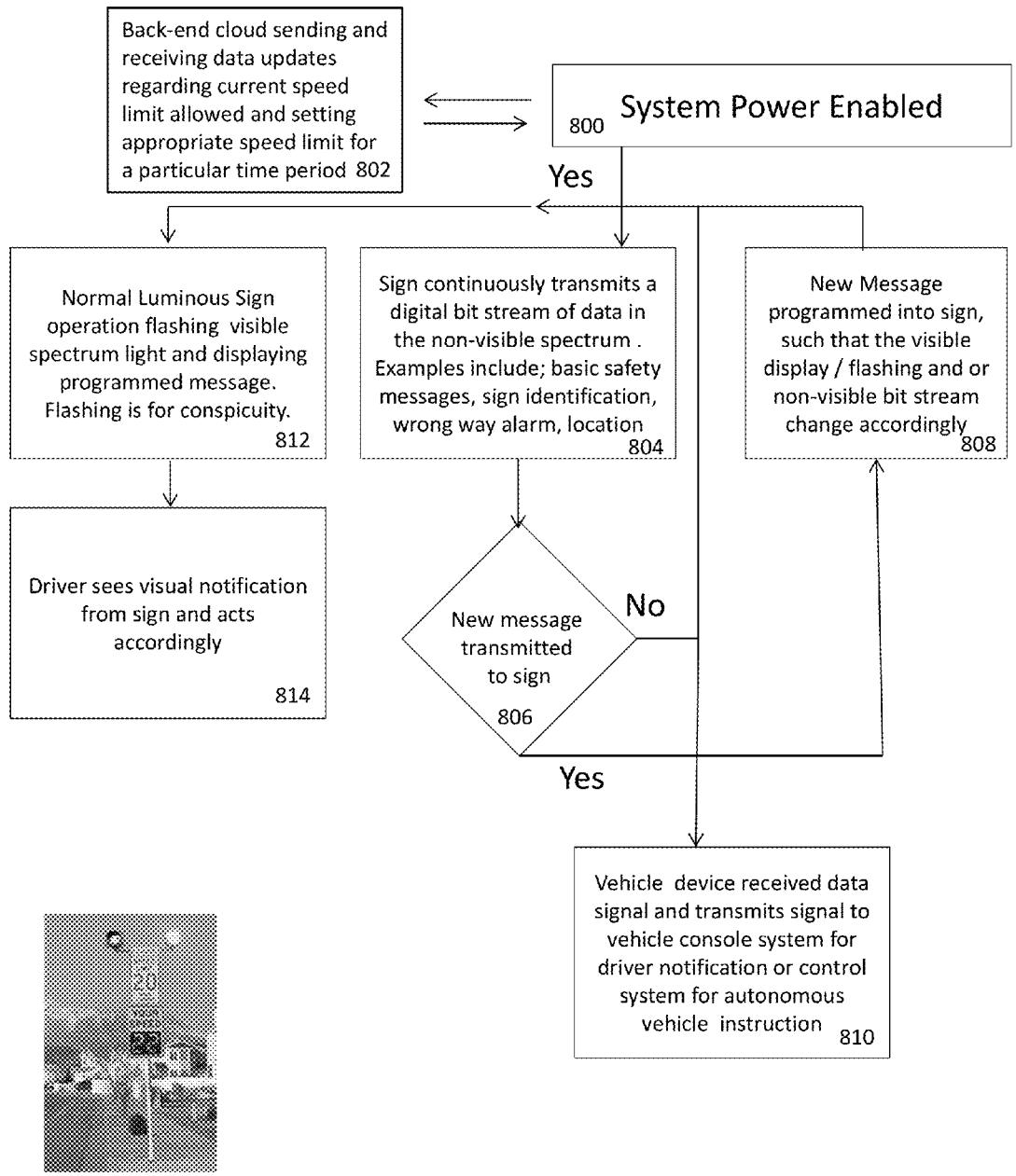
FIG. 8 is a diagram representing an I2V example between a sign with dynamically changing content or broadcast information and a vehicle.

FIG. 8 depicts and additional process flow chart relating to the system and method for dynamically changing content transmitted by an infrastructure device based on updated instructions and transmission of data from a back-end cloud server. The flow chart in FIG. 8 describes the system as being coupled to a power source and the power enabled 800. When the power is enabled the sign communicates with the back-end cloud server to determine the appropriate data to broadcast depending on the date and time 802. In this example embodiment, the back-cloud server sends data to speed limit sign for a school zone where the speed varies given the time school is in session. The back-end cloud server sends the data pertaining to the appropriate speed limit at the particular time and date to the device couple to the sign. As described above, the sign continuously broadcasts 804 the signal while polling 806 the back-end cloud server for new data or waiting for the back-end cloud server to send or push an updated set of data. If new data is found, the system takes the additional step of updating the transmitted data and broadcasting back out to oncoming vehicles 808. In embodiments where the device has the ability to receive data signals, passing by vehicle may transmit pertinent traffic and infrastructure data to the device, and in turn the device may transmit the data back to the back-end cloud server to communicate with other devices coupled to the system 810. In some embodiments, the sign additionally takes the step of flashing 1 sec visible spectrum light during night time 812 to providing additional visual alerts 814.

Figure 9:
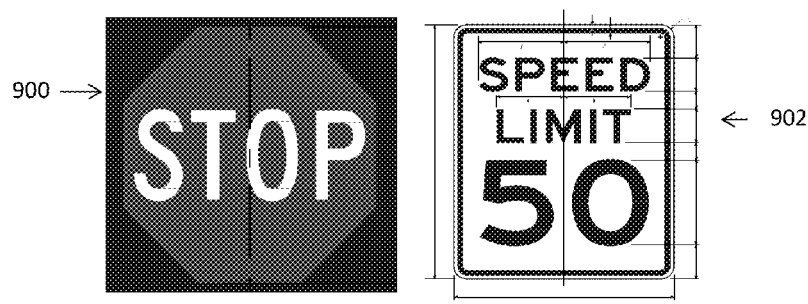
FIG. 9 represents additional a traffic signs with a communications means.
Figure 9:
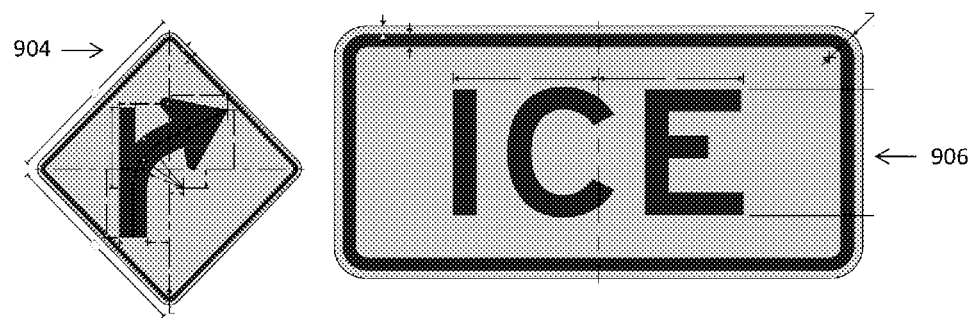

More specific example embodiments include warning signs as shown in FIG. 9. These warning signs may have include embedded data such as a traffic action like stop, a GPS coordinates, information pertaining to a 4-way stop, a proximity sensor to aid the blind or impaired, speed limit in a particular area, curve ahead, ice conditions, and instructions relating to ice related conditions.

Figure 10:
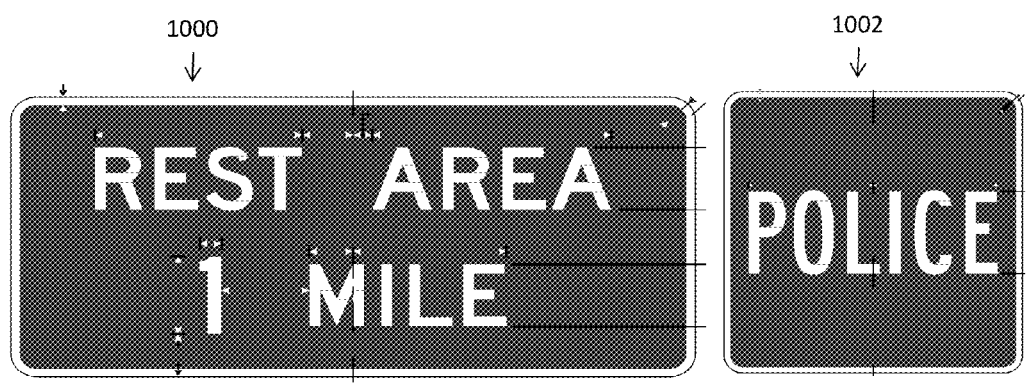
FIG. 10 represents additional a traffic signs with a communications means.

Additional example embodiments include guide signs as shown in FIG. 10. These guide signs may have include embedded data such as location or facility type ahead, GPS coordinates, details concerning the mile marker exit, information about the facility or location.

Figure 11:
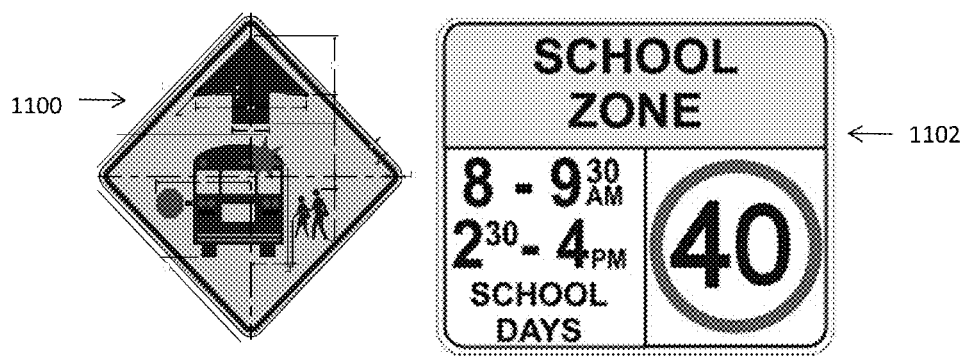
FIG. 11 represents additional a traffic signs with a communications means.

Additional example embodiments include school signs as shown in FIG. 11. These school signs may have include embedded data such as location and sign type, such as a bus stop, stop or slow moving commands in the presences of a school bus, information regarding the particular school and location.

The data in the examples listed above may be embedded, or the sign may be in communication with a cloud server or other connected system members to send and receive updated data. In these embodiments, each message may be secured and/or authenticated such that the sign and the receiving device are not compromised. One example method of security is the use of bit stream to secure and validate the messaging content between devices. Additionally, the non-visible spectrum signal may be modulated or encrypted as needed based on security and environmental requirements.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A roadway and transportation communication system comprising:
   a. a device coupled to or embedded in a vehicle, pedestrian, or roadway infrastructure configured to store data pertaining to the vehicle, pedestrian, or roadway infrastructure and further configured to transmit the data or receive multiple concurrent data streams and store new data wirelessly via the non-visual spectrum of light;
   b. at least a second device coupled to a second vehicle, second pedestrian, or second roadway infrastructure configured to store data pertaining to the second vehicle, second pedestrian, or second roadway infrastructure and further configured to transmit the data pertaining to the second vehicle, second pedestrian, or second roadway infrastructure or receive multiple concurrent data streams and store new data wirelessly via the non-visual spectrum of light;
   c. the device further configured to transmit data to or receive data from the at least second device only when the vehicle, pedestrian or roadway infrastructure is within the line of sight of the second device; and
   d. the at least second device further configured to transmit to or receive data from the device only when the vehicle, pedestrian or roadway infrastructure is within the line of sight of the device.

2. The roadway and transportation communication system of claim 1, wherein the device or the at least second device is further configured to encode the data and to transmit the data through a modulated or a pulsed data bit stream of visible or non-visible light spectrum;
   further wherein the device or at least second device is configured to receive transmitted data through any one of the following line of sight sensors: an optical camera, an IR camera, or receiving sensors that perform in the spectrum; and
   further wherein the device or at least second device is configured to decode the transmitted data.

3. The roadway and transportation communication system of claim 2 wherein the device and the at least second device are further configured to receive and store updated data pertaining to the vehicle, pedestrian, or roadway infrastructure or data pertaining to the second vehicle, second pedestrian, or second roadway infrastructure wirelessly via Wi-Fi, Bluetooth, radio or cellular modem from a cloud server.

4. The roadway and transportation communication system of claim 3 wherein the roadway infrastructure is comprised of any one of the following: road signs, guard rails, bridges, roads, rail crossings, traffic lights, barricades, barriers, walls, and curbs or any traffic device.

5. The roadway and transportation communication system of claim 4 wherein the device is coupled to a road sign and the device is further configured to continuously transmit at least one item of data pertaining to the road sign including: identifying information, GPS location, traffic direction, road hazard information, mile marker, curve ahead, bus stop, school zone, weather information, construction information, exit information, timing, phase or basic safety messages; and
   further wherein the at least one second device is coupled to a vehicle and is further configured to receive the at least one item of data pertaining to the road sign or is further configured to is further configured to receive the at least one item of data pertaining to the road sign and transmit the at least one item of data pertaining to the road sign to a driver notification system within the vehicle.

6. The roadway and transportation communication system of claim 4 wherein the device is coupled to a railway crossing and the device is further configured to continuously transmit at least one item of data pertaining to the railway crossing including: identifying information, GPS location, crossing gate position, nearest train position; and
   further wherein the at least one second device is coupled to a vehicle and is further configured to receive the at least one item of data pertaining to the railway crossing or is further configured to is further configured to receive the at least one item of data pertaining to the railway crossing and transmit the at least one item of data pertaining to the railway crossing to a driver notification system within the vehicle.

7. The roadway and transportation communication system of claim 4 wherein the device is coupled to a traffic light and the device is further configured to continuously transmit at least one item of data pertaining to the traffic light including: identifying information, GPS location, traffic direction, signal phase, and signal timing; and
   further wherein the at least one second device is coupled to a vehicle and is further configured to receive the at least one item of data pertaining to the traffic signal or is further configured to is further configured to receive the at least one item of data pertaining to the traffic signal and transmit the at least one item of data pertaining to the road sign to a driver notification system within the vehicle.

8. The roadway and transportation communication system of claim 1 wherein the non-visual spectrum of light is any one of the following: infrared, microwave spectrum, and audio spectrum.

9. The roadway and transportation communication system of claim 2 wherein the device or the at least second device are further configured to receive a transmitted data signal and further transmit the data signal to an additional notification system including a mobile application configured for a mobile computing device, a back-end cloud server, or a vehicle console system.

10. A method for vehicle, pedestrian and roadway infrastructure roadway communication comprising:
    a. providing a device coupled to the vehicle, pedestrian, or roadway infrastructure configured to store data pertaining to the vehicle, pedestrian, or roadway infrastructure and further configured to transmit the data and receive multiple concurrent data streams wirelessly via the non-visual spectrum of light;
    b. providing at least a second device coupled to a second vehicle, second pedestrian, or second roadway infrastructure configured to store data pertaining to the second vehicle, second pedestrian, or second roadway infrastructure and further configured to transmit the data pertaining to the second vehicle, second pedestrian, or second roadway infrastructure and receive multiple concurrent data streams wirelessly via the non-visual spectrum of light;

c. transmitting the data from the device coupled to the vehicle, pedestrian, or roadway infrastructure to the at least second device only when the vehicle, pedestrian or roadway infrastructure is within the line of sight of the second device; and d. receiving the data transmitted by the device onto the at least second device.

11. The method of claim 10 further comprising the step of the at least second device transmitting the received data to a notification system.

12. The method of claim 11 wherein the notification system is a vehicle console unit or mobile application for a mobile computing device or cloud server.

13. The method of claim 12 wherein the data signal is confirmatory and the notification system further alerts a driver via the vehicle console unit or mobile application of data pertaining to the vehicle, pedestrian, or roadway infrastructure including one of the following: object identifying information, GPS location, traffic direction, road hazard information, mile marker, curve ahead, bus stop, school zone, weather information, construction information, exit information, traffic direction, light state, time to light change, crossing gate position, and nearest train position; or
   further wherein the data signal is confirmatory and redundant and comprising the additional step of validating the data received with an additional communication system.

14. The method of claim 10 wherein the data signal is a control signal and further comprising the step of the at least second device transmitting the received data to a vehicle control system configured to interpret the data signal and autonomously control the vehicle without driver interaction.

* * * * *